US012416488B2

(12) United States Patent
Liu

(10) Patent No.: US 12,416,488 B2
(45) Date of Patent: Sep. 16, 2025

(54) IMAGE CAPTURE DEVICE AND OPERATION METHOD THEREOF

(71) Applicant: NATIONAL TAIWAN UNIVERSITY, Taipei (TW)

(72) Inventor: Hao-Li Liu, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 145 days.

(21) Appl. No.: 18/419,565

(22) Filed: Jan. 23, 2024

(65) Prior Publication Data

US 2025/0030961 A1     Jan. 23, 2025

(30) Foreign Application Priority Data

Jul. 19, 2023   (TW) ................................ 112126981

(51) Int. Cl.
*G01B 9/02015*   (2022.01)
*G02B 26/08*     (2006.01)
*H04N 25/701*    (2023.01)
*H04N 25/75*     (2023.01)

(52) U.S. Cl.
CPC ....... *G01B 9/0203* (2013.01); *G02B 26/0833* (2013.01); *H04N 25/701* (2023.01); *H04N 25/75* (2023.01)

(58) Field of Classification Search
None
See application file for complete search history.

(56) References Cited

U.S. PATENT DOCUMENTS

| 5,528,642 A  * | 6/1996  | Hirama ................ H04N 25/713 348/E5.079 |
| 11,496,677 B2 | 11/2022 | Lee et al. |
| 2006/0206102 A1 | 9/2006 | Shimmick |
| 2009/0021600 A1* | 1/2009 | Watanabe ............ H04N 23/673 348/222.1 |
| 2017/0319176 A1 | 11/2017 | Stramigioli |
| 2018/0140195 A1* | 5/2018 | Liu ........................ G01B 17/00 |
| 2019/0073000 A1* | 3/2019 | Lee .......................... G06F 1/266 |
| 2020/0278427 A1* | 9/2020 | Chen ........................ G01S 7/4972 |
| 2020/0374495 A1* | 11/2020 | Gibson ................ H04N 9/3129 |
| 2021/0109952 A1* | 4/2021 | Meyerzon ............. G06F 16/355 |

(Continued)

FOREIGN PATENT DOCUMENTS

| CN | 102046071 B | 11/2013 |
| CN | 113208653 A | 8/2021 |

(Continued)

OTHER PUBLICATIONS

Shih-Xin Tan, "Design of FPGA based Image Acquisition Device for Spectral Domain Optical Coherence Tomography", Sep. 2022, Master Thesis, National Taiwan University.

*Primary Examiner* — Twyler L Haskins
*Assistant Examiner* — Wesley J Chiu
(74) *Attorney, Agent, or Firm* — CKC & Partners Co., LLC

(57) ABSTRACT

An operation method of an image capture device includes steps as follows. The MEMS driver is controlled through the field programmable gate array (FPGA) independently to adjust at least one micro electro mechanical system (MEMS) scanning mirror of the optical system; at least one digital signal provided by the linear image sensor module is processed through the FPGA directly so as to obtain at least one image data.

13 Claims, 9 Drawing Sheets

(56) References Cited

U.S. PATENT DOCUMENTS

2022/0078341 A1* 3/2022 Lee .................. H04N 23/56
2023/0168349 A1* 6/2023 Hofbauer ............. G01S 7/4817
356/4.01

FOREIGN PATENT DOCUMENTS

CN 115209813 A 10/2022
TW 201818882 A 6/2018

* cited by examiner

IMAGE CAPTURE DEVICE AND OPERATION METHOD THEREOF

RELATED APPLICATIONS

This application claims priority to Taiwan Patent Application No. 112126981, filed Jul. 19, 2023, the entirety of which is herein incorporated by reference.

BACKGROUND

Field of Invention

The present invention relates to capture devices, and more particularly, an image capture device and an operating method thereof.

Description of Related Art

Currently, most optical systems of medical imaging are equipped with light sources, scanning mirrors and circuit systems in terms of image receiving and processing equipment, resulting in the overall cost of the optical system being quite high, which greatly limits the acceptance of general clinics or home health care. The optical systems are generally only available in large eye centers or hospitals, and the universality of the optical systems is not high. Most optical systems currently on the market are relatively large in size and require additional large-scale computers for data processing, which also limits the convenience of optical systems.

Although there are currently a few handheld or home-type portable scanners available, the image receiving end of such portable scanners still uses large computer devices for calculations. The installation of large computers also means that their convenience is relatively poor, and the system cost is too high.

SUMMARY

In one or more various aspects, the present disclosure is directed to an image capture device and an operating method thereof.

One embodiment of the present disclosure is related to an image capture device, which includes a linear image sensor module, a MEMS (micro electro mechanical system) driver and a FPGA (field programmable gate array). The linear image sensor module is aligned with a lens of an optical system, and the lens located between a grating of the optical system and the linear image sensor module. The MEMS driver is electrically connected to at least one MEMS scanning mirror of the optical system. The FPGA is electrically connected to the linear image sensor module and the MEMS driver, where the FPGA independently controls the MEMS driver to adjust the at least one MEMS scanning mirror, and the FPGA directly processes at least one digital signal provided by the linear image sensor module, so as to obtain at least one image data.

In one embodiment of the present disclosure, the FPGA simultaneously processes a plurality of threads of execution of the linear image sensor module and simultaneously processes a plurality of threads of execution of the MEMS driver.

In one embodiment of the present disclosure, the linear image sensor module includes a plurality of analog-to-digital converters, a plurality of CCD (charge-coupled device) sensors and a plurality of driving circuits. The analog-to-digital converters are electrically connected to the FPGA. The CCD sensors are electrically connected to the analog-to-digital converters. The driving circuits are electrically connected to the CCD sensors respectively, and the driving circuits are electrically connected to the FPGA, where the FPGA drives the CCD sensors through the driving circuits simultaneously, so that the CCD sensors output a plurality of pixel analog signals to the analog-to-digital converters respectively, the analog-to-digital converters convert the pixel analog signals into a plurality of digital signals respectively, and the FPGA processes the digital signals simultaneously, so as to obtain the at least one image data.

In one embodiment of the present disclosure, the at least one MEMS scanning mirror includes a plurality of MEMS scanning mirrors, and the MEMS driver includes a plurality of amplifiers and a plurality of digital-to-analog converters. The amplifiers are electrically connected to the plurality of the MEMS scanning mirrors. The digital-to-analog converters are electrically connected to the plurality of the amplifiers, and the digital-to-analog converters are electrically connected to the FPGA, where the FPGA simultaneously sends a plurality of trigger signals to the digital-to-analog converters, so that the digital-to-analog converters send a plurality of analog triangle wave signals to the amplifiers respectively, and the amplifiers send a plurality of amplified analog triangle wave signals to the MEMS scanning mirrors respectively.

In one embodiment of the present disclosure, the FPGA uses its block RAM (block random access memory) to synthesize a read-only memory, the read-only memory accesses a triangular wave digital value and a register value corresponding to a functional configuration of each of the digital-to-analog converters, the FPGA transmits the triangular wave digital value and the register value to a SRAM (static random-access memory) of each of the digital-to-analog converters through a serial peripheral interface, after the functional configuration of each of the digital-to-analog converters is completed, the FPGA simultaneously gives the trigger signals to the digital-to-analog converters, each of the digital-to-analog converters correspondingly converts the triangular wave digital value in the SRAM into the analog triangle wave signal and outputs the analog triangle wave signal to a corresponding one of the amplifiers, and the amplified analog triangle wave signal output by each of the amplifiers matches a driving voltage range of each corresponding one of the MEMS scanning mirrors.

In one embodiment of the present disclosure, the image capture device further includes a USB (universal serial bus) control chip and a USB port. The USB control chip is electrically connected to the FPGA. The USB port is electrically connected to the USB control chip, where the USB port is configured to connect a display device, and the FPGA causes the display device to render an imaging screen based on the at least one image data through the USB control chip.

In one embodiment of the present disclosure, an objective lens of the optical system is disposed between an interferometer and an ultrasonic transducer, and when the objective lens is aligned with a biological tissue, the ultrasonic transducer is located between the objective lens and the biological tissue.

In one embodiment of the present disclosure, the optical system includes the objective lens and the interferometer, an ultrasound system includes the ultrasonic transducer, and the FPGA simultaneously supports a synchronous operation of the optical system and the ultrasound system.

Another embodiment of the present disclosure is related to an operation method of an image capture device. The operation method includes steps of: (A) individually controlling a MEMS driver through a FPGA to adjust at least one MEMS scanning mirror of an optical system; (B) directly processing at least one digital signal provided by a linear image sensor module through the FPGA, so as to obtain at least one image data.

In one embodiment of the present disclosure, the operation method further includes: simultaneously processing a plurality of threads of execution of the MEMS driver through the FPGA.

In one embodiment of the present disclosure, the operation method further includes: simultaneously processing a plurality of threads of execution of the linear image sensor module through the FPGA.

In one embodiment of the present disclosure, the linear image sensor module includes a plurality of analog-to-digital converters, a plurality of CCD sensors and a plurality of driving circuits, and the step (B) includes: using the FPGA to drive the CCD sensors through the driving circuits simultaneously, so that the CCD sensors output a plurality of pixel analog signals to the analog-to-digital converters respectively; using the analog-to-digital converters to convert the pixel analog signals into a plurality of digital signals respectively; and using the FPGA to process the digital signals simultaneously, so as to obtain the at least one image data.

In one embodiment of the present disclosure, the at least one MEMS scanning mirror includes a plurality of MEMS scanning mirrors, the MEMS driver includes a plurality of amplifiers and a plurality of digital-to-analog converters, and the step (A) includes: using the FPGA simultaneously to send a plurality of trigger signals to the digital-to-analog converters, so that the digital-to-analog converters send a plurality of analog triangle wave signals to the amplifiers respectively; and using the amplifiers to send a plurality of amplified analog triangle wave signals to the MEMS scanning mirrors respectively.

In one embodiment of the present disclosure, the step (A) further includes: using a block RAM of the FPGA to synthesize a read-only memory, where the read-only memory accesses a triangular wave digital value and a register value corresponding to a functional configuration of each of the digital-to-analog converters; using the FPGA to transmit the triangular wave digital value and the register value to a SRAM of each of the digital-to analog converters through a serial peripheral interface; after the functional configuration of each of the digital-to-analog converters is completed, using the FPGA simultaneously to give the trigger signals to the digital-to-analog converters, so that each of the digital-to-analog converters correspondingly converts the triangular wave digital value in the SRAM into the analog triangle wave signal and outputs the analog triangle wave signal to a corresponding one of the amplifiers, where the amplified analog triangle wave signal output by each of the amplifiers matches a driving voltage range of each corresponding one of the MEMS scanning mirrors.

In one embodiment of the present disclosure, the operation method further includes: using the FPGA causes a display device to render an imaging screen based on the at least one image data through a USB control chip.

Technical advantages are generally achieved, by embodiments of the present disclosure. Through the image capture device and its operation method of the present disclosure, the portable optical scanner (e.g., the optical system) and the ultrasound system (e.g., the ultrasonic transducer, etc.) can use FPGA to implement scanning mechanisms and image processing at the same time, thereby reducing the overall volume. Furthermore, the FPGA can process multiple threads of execution at the same time, thereby greatly saving computing time.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
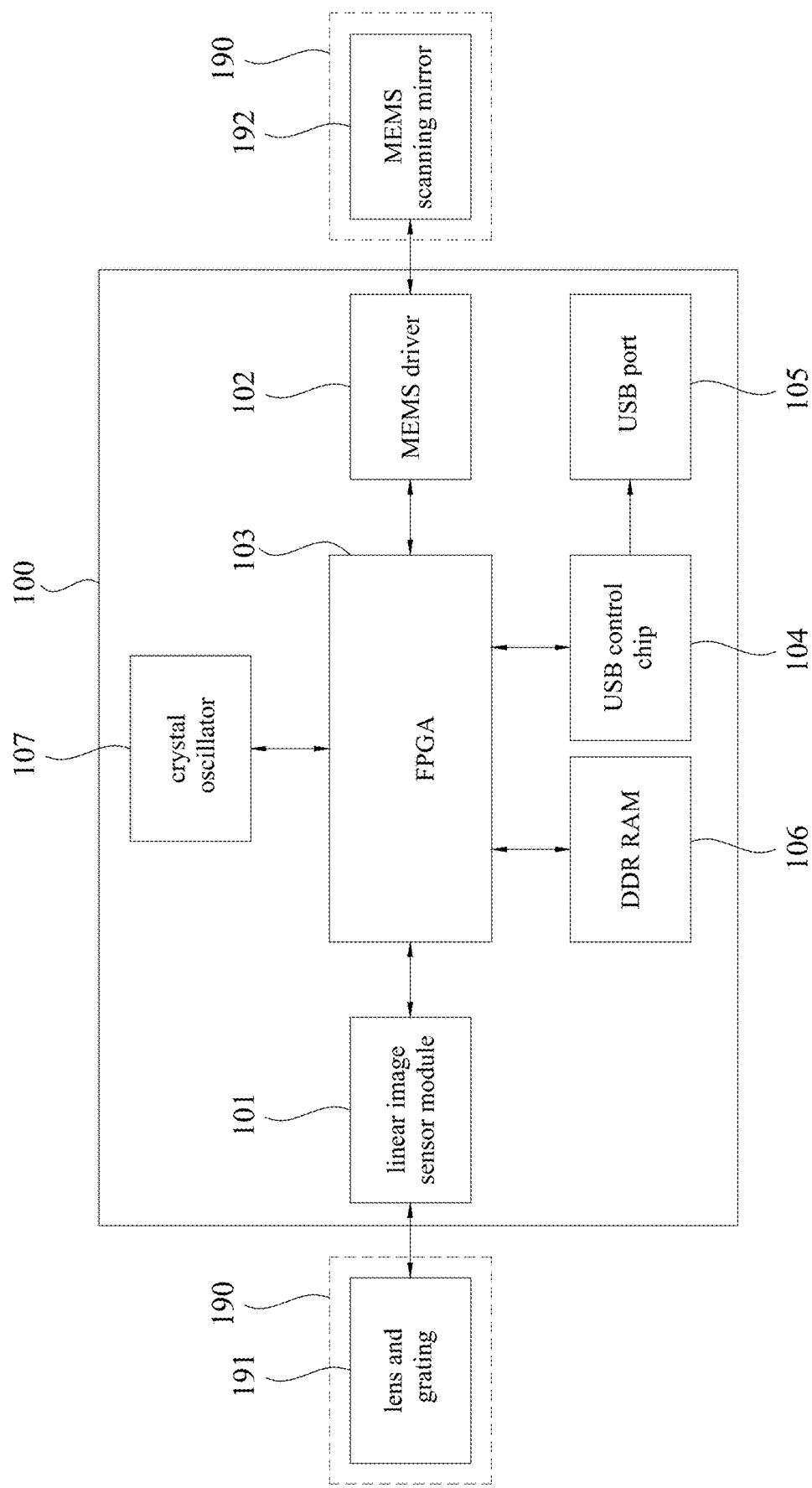
FIG. 1 is a block diagram of an image capture device according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, in one aspect, the present disclosure is directed to an image capture device 100. This image capture device may be easily integrated into a portable medical imaging device and may be applicable or readily adaptable to all technologies. Accordingly, the image capture device 100 has advantages. Herewith the image capture device 100 is described below with FIG. 1.

The subject disclosure provides the image capture device 100 in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

FIG. 1 is a block diagram of a image capture device 100 according to one embodiment of the present disclosure. As shown in FIG. 1, the image capture device 100 includes a linear image sensor module 101, a MEMS driver 102, a FPGA 103, an USB control chip 104, an USB port 105, a DDR RAM (Double Data Rate Random-Access Memory) 106 and a crystal oscillator 107.

In structure, the FPGA 103 is electrically connected to the linear image sensor module 101 and the MEMS driver 102. The MEMS driver 102 is electrically connected to the MEMS scanning mirror 192 of the optical system 190. The linear image sensor module 101 is aligned with a lens and a grating 191 (e.g., a focusing lens and a grating) of the optical system 190. The USB control chip 104 is electrically connected to the FPGA 103, and the USB port 105 is electrically connected to the USB control chip 104. The DDR RAM 106 and crystal oscillator 107 are electrically connected to the FPGA 103.

In use, the FPGA 103 independently controls the MEMS driver 102 to adjust the MEMS scanning mirror 192, and the FPGA 103 directly processes at least one digital signal provided by the linear image sensor module 101, so as to obtain at least one image data. In this way, the image capture device 100 does not need to be equipped with a computer, and can realize the scanning mechanism and image processing through the FPGA 103, thereby reducing the overall size.

Specifically, the optical system 190 (e.g., a spectrometer) is calibrated to be fixed to the linear image sensor module 101, and the connection uses the circuit board of the FPGA 103 with a flexible bus. The crystal oscillator 107 provides a clock signal, and the FPGA 103 controls the MEMS driver 102 to rotate the MEMS scanning mirror 192 to reflect light to different positions of the sample; at the same time, the FPGA 103 drives the linear image sensor module 101 to receive the spectral interference signal of each position of the sample, and the FPGA 103 receives the original image data. Whenever the MEMS driver 102 rotates for one unit time, the linear image sensor module 101 can scan the output signal of the optical system 190 and send the output signal to the FPGA 103 to obtain a one-dimensional image. After the MEMS scanning mirror 192 completes one cycle, the FPGA 103 can receive the complete two-dimensional image of the sample, and this image is stored in DDR RAM 106 as a frame buffer. At this time, the FPGA 103 can use the image data for optical coherent tomography (OCT) image processing. The processed image data can be transmitted to the display device through the USB control chip 104 and the USB port 105.

In one embodiment of the present disclosure, the FPGA 103 simultaneously processes a plurality of threads of execution of the linear image sensor module 101 and simultaneously processes a plurality of threads of execution of the MEMS driver 102, thereby greatly saving computing time. In a controlled experiment, the FPGA 103 is replaced by a computer for calculation, or the FPGA 103 is simply used as a data transmission medium and the computer is used for calculation. Since the computer only can process serial information one by one, it cannot process multiple threads of execution at the same time, resulting in low performance.

Figure 2:
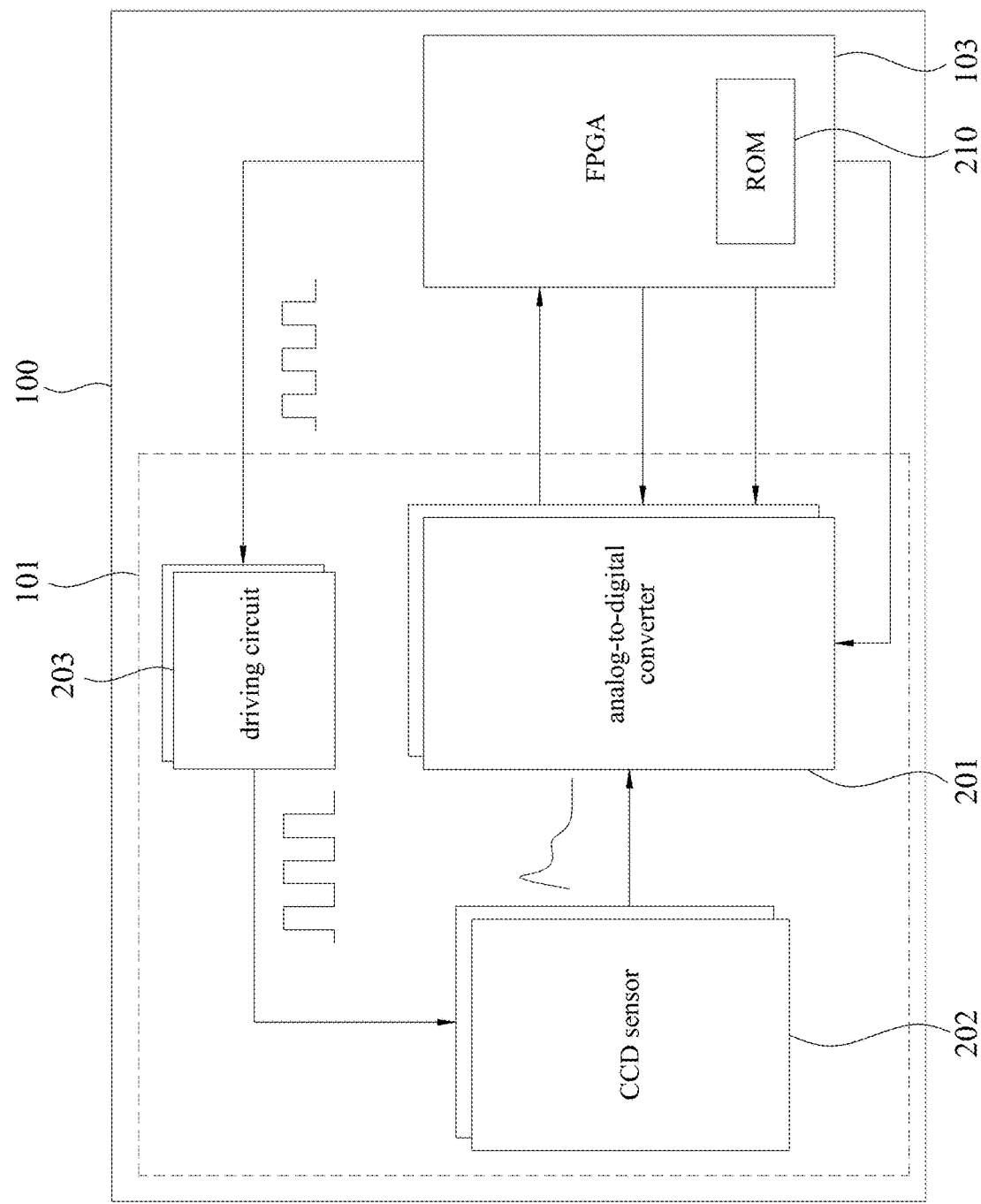
FIG. 2 is a block diagram of a linear image sensor module according to one embodiment of the present disclosure.

For a more complete understanding of the hardware architecture of the linear image sensor module 101, refer to FIG. 1 and FIG. 2. FIG. 2 is a block diagram of the linear image sensor module 101 according to one embodiment of the present disclosure. As shown in FIG. 2, the linear image sensor module 101 includes a plurality of analog-to-digital converters 201, a plurality of CCD sensors 202 and a plurality of driving circuits 203. For example, the CCD sensor 202 is a linear array CCD sensor.

In structure, the analog-to-digital converters 201 are electrically connected to the FPGA 103, the CCD sensors 202 are electrically connected to the analog-to-digital converters 201, and the driving circuits 203 are electrically connected to the CCD sensors 202. The driving circuits 203 are electrically connected to the FPGA 103.

Figure 4:
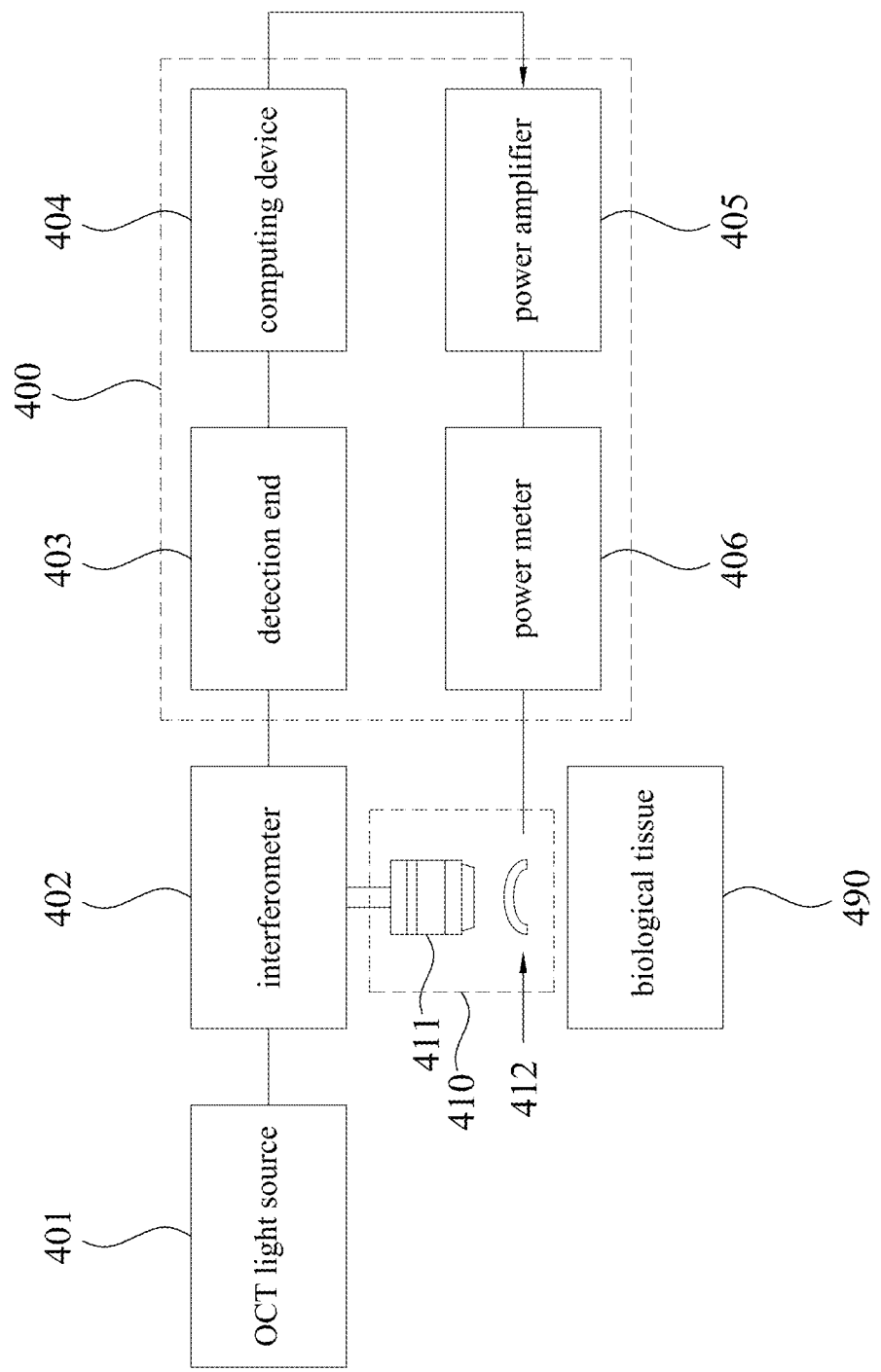
FIG. 4 is a block diagram of an image capture device according to another embodiment of the present disclosure.

In use, the FPGA 103 drives the CCD sensors 202 through the driving circuits 203 simultaneously, so that the CCD sensors 202 output a plurality of pixel analog signals to the analog-to-digital converters 201 respectively, the analog-to-digital converters 201 convert the pixel analog signals into a plurality of digital signals respectively, and the FPGA 103 processes the digital signals simultaneously so as to obtain the at least one image data and can simultaneously trigger the synchronous action function of another imaging devices (e.g., the ultrasound system in FIG. 4). In this way, the FPGA 103 simultaneously processes multiple threads of execution of multiple analog-to-digital converters 201 in the linear image sensor module 101, thereby greatly saving the computing time.

Specifically, in one embodiment of the present disclosure, the FPGA 103 uses its block RAM to synthesize a read-only memory (ROM) 210 to access the data value of one function configuration of each of the analog-to-digital converters 201, and uses serial transmission to perform the initial configuration on the analog-to-digital converters 201 for setting the register value of each function in the analog-to-digital converters 201. After the function configuration of each of the analog-to-digital converters 201 is completed, the FPGA 103 can output the driving clocks of the CCD sensors 202 respectively. The driving clocks through the driving circuits 203 to convert the voltage levels of the driving clocks into the voltage levels required by the CCD sensors 202. After the driving of multiple CCD sensors 202 is completed, corresponding pixel analog signals can be output to the analog-to-digital converters 201 respectively. Cache amplifiers can be designed between the CCD sensors 202 and the analog-to-digital converters 201, so that the output signals of the CCD sensors 202 have enough driving capability to drive multiple analog front-end circuits in the analog-to-digital converters 201. The analog-to-digital converters 201 can convert the output signals from the CCD sensors 202 into digital signals. The digital signals can be transmitted to the FPGA 103 through the flexible bus, so that the FPGA 103 can obtain the original image data.

Figure 3:
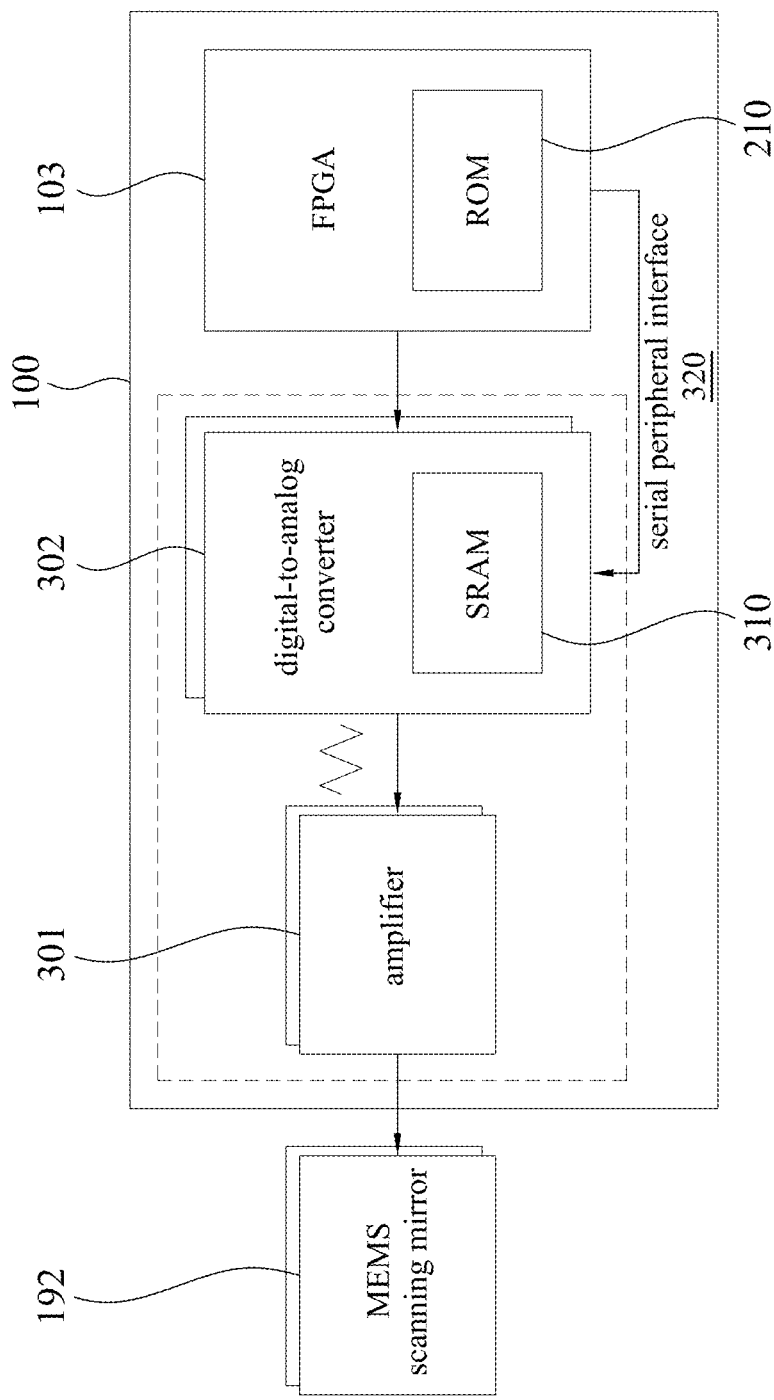
FIG. 3 is a block diagram of a MEMS driver according to one embodiment of the present disclosure.

For a more complete understanding of the hardware architecture of the MEMS driver 102, refer to FIG. 1 and FIG. 3. FIG. 3 is a block diagram of a MEMS driver 102 according to one embodiment of the present disclosure. As shown in FIG. 3, the MEMS driver 102 includes amplifiers 301 and digital-to-analog converters 302. The number of the MEMS scanning mirrors 192 is correspondingly multiple.

In structure, the amplifiers 301 are electrically connected to the MEMS scanning mirrors 192, the digital-to-analog converters 302 are electrically connected to the amplifiers 301, and the digital-to-analog converters 302 are electrically connected to the FPGA 103.

In use, the FPGA 103 sends trigger signals to the digital-to-analog converters 302 at the same time, so that the digital-to-analog converters 302 can send analog triangle wave signals to the amplifiers 301 respectively, and the amplifiers 301 can send the amplified analog triangle wave signals to the MEMS scanning mirrors 192 respectively. In this way, the FPGA 103 simultaneously processes multiple threads of execution of the digital-to-analog converters 302 in the MEMS driver 102, thereby greatly saving computing time.

The MEMS scanning mirror 192 is used to rotate in a voltage-driven manner, that is, within a certain voltage range, the angle of the MEMS scanning mirror 192 can rotate to different positions according to different voltage values. Therefore, the present disclosure uses triangular waves as the rotation control signal of the MEMS scanning mirror 192 and periodically provides a triangular wave to the MEMS scanning mirror 192, so that the MEMS scanning mirror 192 can rotate back and forth regularly.

Specifically, in some embodiments of the present disclosure, the FPGA 103 uses its block RAM (block random access memory) to synthesize a read-only memory 210, the read-only memory 210 accesses a triangular wave digital value and a register value corresponding to a functional configuration of each of the digital-to-analog converters 302, the FPGA 103 transmits the triangular wave digital value and the register value to a SRAM (static random-access memory) 310 of each of the digital-to analog converters through a serial peripheral interface 320. After the functional configuration of each of the digital-to-analog converters 302 is completed, the FPGA 103 simultaneously gives the trigger signals to the digital-to-analog converters 302, each of the digital-to-analog converters 302 correspondingly converts the triangular wave digital value in the SRAM 310 into the analog triangle wave signal and outputs the analog triangle wave signal to a corresponding one of the amplifiers 301, and the amplified analog triangle wave signal output by each of the amplifiers 301 matches a driving voltage range of each corresponding one of the MEMS scanning mirrors 192.

In one embodiment of the present disclosure, the USB port 105 is configured to connect a display device, and the FPGA 103 causes the display device to render an imaging screen based on the at least one image data through the USB control chip 104. At the same time, through the synchronous triggering function of the USB control chip 104, the operation of other devices can be triggered synchronously, such as the synchronous action function of the ultrasonic system (e.g., an ultrasonic actuator, an ultrasonic imaging device, etc.) in FIG. 4. In practice, for example, the USB control chip 104 and the USB port 105 support USB 3.0 to transmit large amounts of data in real time, allowing the FPGA 103 to implement a state machine to complete data streaming transmission.

FIG. 4 is a block diagram of an image capture device 400 according to another embodiment of the present disclosure. As shown in FIG. 4, the image capture device 400 includes a detection end 403, a computing device 404, a power amplifier 405 and a power meter 406. In some embodiments of the present disclosure, the computing device 404 is the FPGA 103 in FIG. 1, and the detection end 403 is a pin of the FPGA 103.

In structure, the detection end 403 is electrically connected to the computing device 404, the computing device 404 is electrically connected to the power amplifier 405, and the power amplifier 405 is electrically connected to the power meter 406.

On the other hand, in some embodiments of the present disclosure, the optical system 190 in FIG. 1 can include an OCT light source 401, an interferometer 402, and an optical scanning and ultrasonic combined device 410. The optical scanning and ultrasonic combined device 410 includes an objective lens 411 and an ultrasonic transducer 412. For example, the ultrasonic transducer 412 can be a dual-purpose focused ultrasonic transducer that is both transceiver and transceiver.

In structure, the OCT light source 401 is connected to the interferometer 402, the interferometer 402 is electrically connected to the detection end 403, and the power meter 406 is electrically connected to the ultrasonic transducer 412. In this way, the optical system (e.g., the OCT light source 401, the interferometer 402 and the optical scanning and the objective lens 411) and the ultrasonic system (e.g., the ultrasonic transducer 412, the power amplifier 405 and the power meter 406) can use the computing device 404 (e.g., the FPGA 103 in FIG. 1, the USB control chip 104, etc.) implements scanning mechanism and image processing. For example, through the synchronous triggering function of the USB control chip 104, the synchronous action of the ultrasonic actuator can be triggered synchronously. In other words, the computing device 404 (e.g., the FPGA 103 in FIG. 1, the USB control chip 104, etc.) can simultaneously support the synchronous operation of the above-mentioned optical system and the above-mentioned ultrasound system.

In some embodiments of the present disclosure, in order to allow the beam of the OCT light source 401 and the focused ultrasound (FUS) signal of the ultrasonic transducer 412 to illuminate the same area and the same depth, the ultrasonic transducer 412 is set up at the scanning end of the optical system. The optical coherent tomography beam is focused by the objective lens 411 and then hits the biological tissue 490. The ultrasonic focus depth of the ultrasonic transducer 412 can be designed to be the same as the depth of the optical coherent tomography beam. Therefore, the optical coherent tomography beam and the focused ultrasound signal are focused on the same range and depth to achieve simultaneous monitoring and treatment.

In some embodiments of the present disclosure, the objective lens 411 is disposed between the interferometer 402 and the ultrasonic transducer 412. When the objective lens 411 is aligned with the biological tissue 490, the ultrasonic transducer 412 is located between the objective lens 411 and the biological tissue 490. In other words, the objective lens 411 and ultrasonic transducer 412 of the optical scanning and ultrasonic combined device 410 both face the same side of the biological tissue 490, so that the optical coherent tomography beam and the focused ultrasonic signal are focused on the same range and depth. In a control experiment, the objective lens and ultrasonic transducer are placed on opposite sides of the biological tissue. When the biological tissue is the human eye, the objective lens and ultrasonic transducer of the control experiment need to be located on both sides of the head, thereby causing the system to be too large, and the ultrasound passes through the head to cause too much noise. If the ultrasound power is increased, it will cause brain damage.

Figure 5:
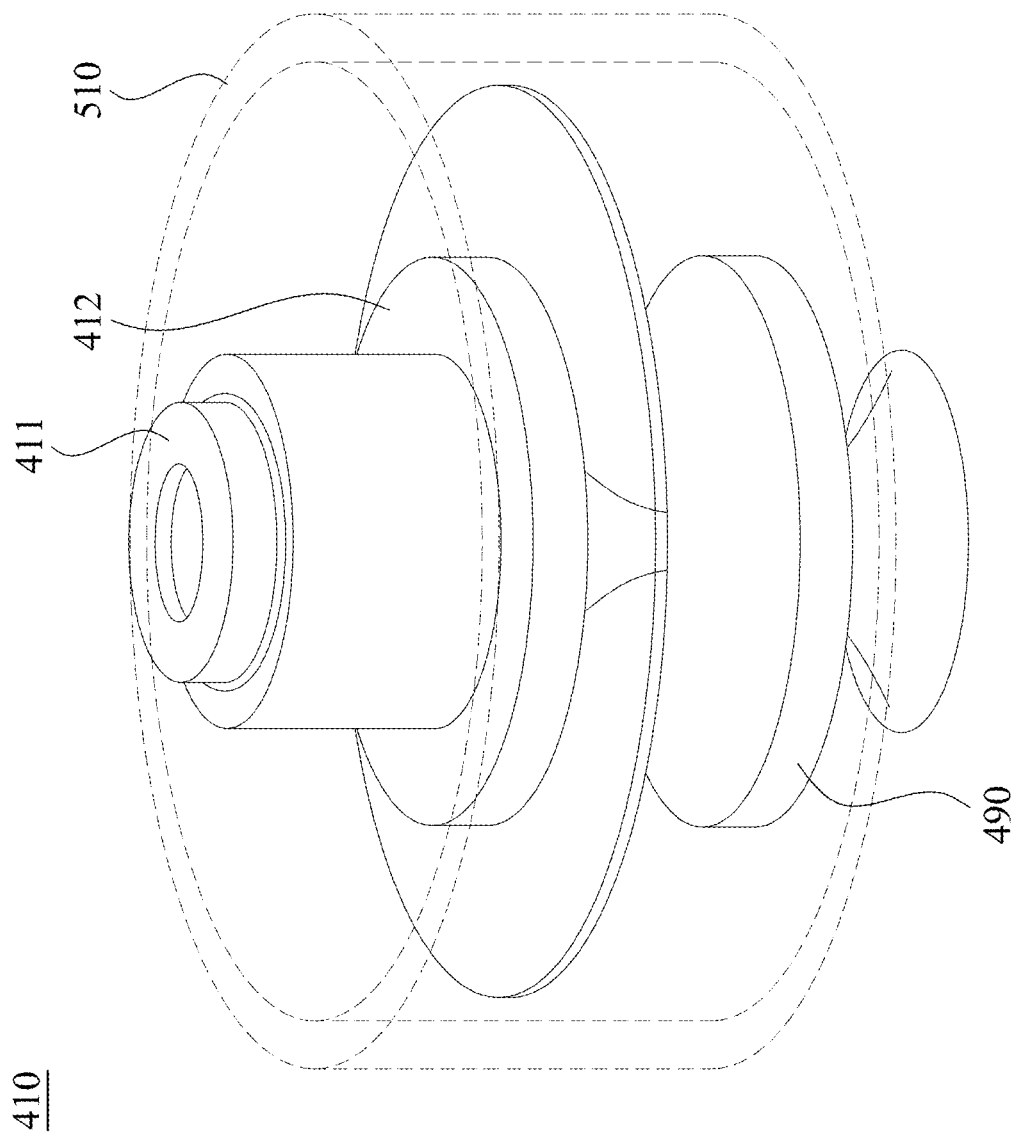
FIG. 5 is a perspective view of an optical scanning and ultrasonic combined device according to one embodiment of the present disclosure.
Figure 6:
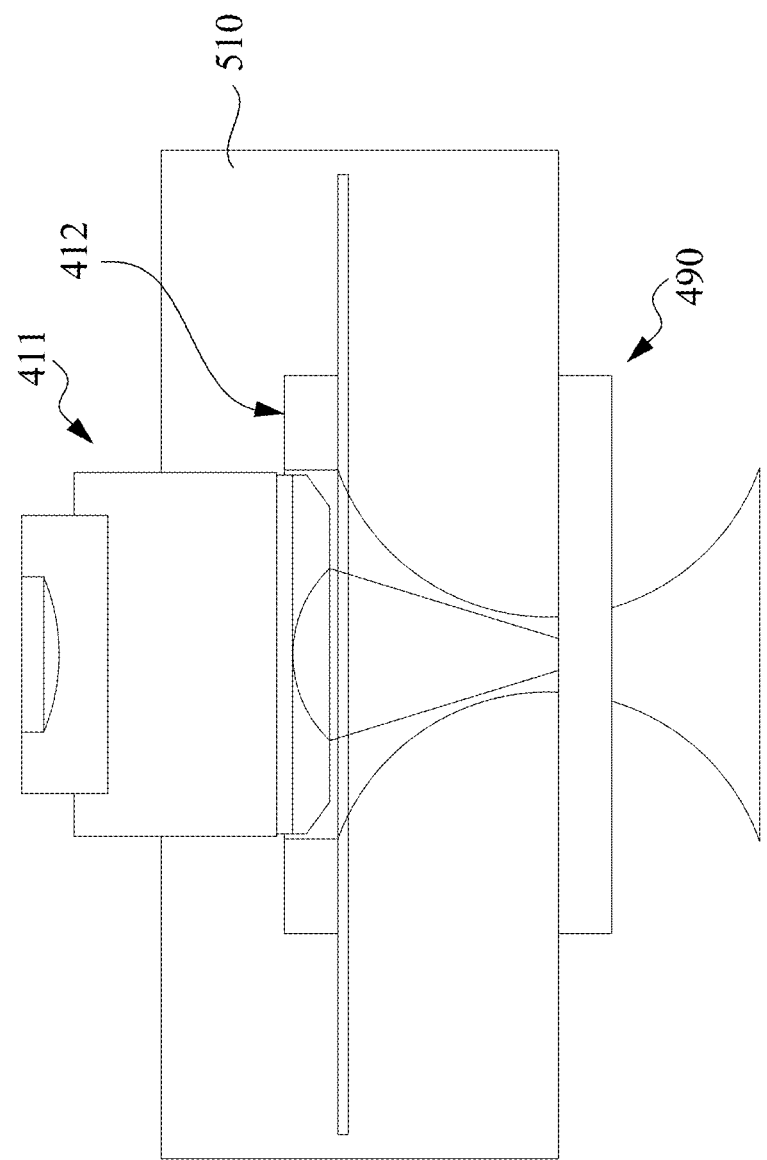
FIG. 6 is a cross-sectional view of an optical scanning and ultrasonic combined device according to one embodiment of the present disclosure.

For a more complete understanding of the hardware architecture of the optical scanning and ultrasonic combined device 410, refer to FIG. 4, FIG. 5 and FIG. 6. FIG. 5 is a perspective view of an optical scanning and ultrasonic combined device 410 according to one embodiment of the present disclosure. FIG. 6 is a cross-sectional view of an optical scanning and ultrasonic combined device 410 according to one embodiment of the present disclosure. As shown in FIGS. 5 and 6, the present disclosure miniaturizes and integrates the scanning end of the optical coherent tomography the ultrasonic transducer 412. The ultrasonic transducer 412 is arranged on the periphery of the objective lens 411, thereby leaving a hole in the center for the light path of the optical coherent tomography area to pass through. In addition, the ultrasonic waves need to be transmitted through the medium to avoid loss, so a container 510 is set outside objective lens 411, and container 510 is filled with water to facilitate the propagation of ultrasonic waves. In addition, the water container with its specifications can also be set up in the reference arm of optical coherent tomography to eliminate system dispersion.

In some embodiments of the present disclosure, the present disclosure selects microbubbles as a developer to enhance the image contrast of optical coherent tomography. In order to verify the enhancement effect of microbubbles on optical coherent tomography scattering signals, the microbubbles are first dissolved in an aqueous solution for dilution, then pour the aqueous solution containing microbubbles into a drip tube, and then use the rear-end drip pump to promote the flow of liquid in the tube. The drip tube is fixed under the optical system, and the optical system scans the drip tube; at the same time, the ultrasonic transducer 412 emits ultrasound waves of different powers to the drip tube, the ultrasound application mode is set to a pulsed wave mode and a continuous wave mode, and the ultrasound power is set to 0.9, 4.9 and 9.9 W respectively. When the ultrasound power continues to increase, the image of the drip tube also continues to become stronger. Especially when the ultrasound irradiation mode is continuous wave mode, the image is significantly enhanced. Even when only low-power continuous wave irradiation is used, the image of the drip tube can also be enhanced.

Figure 7:
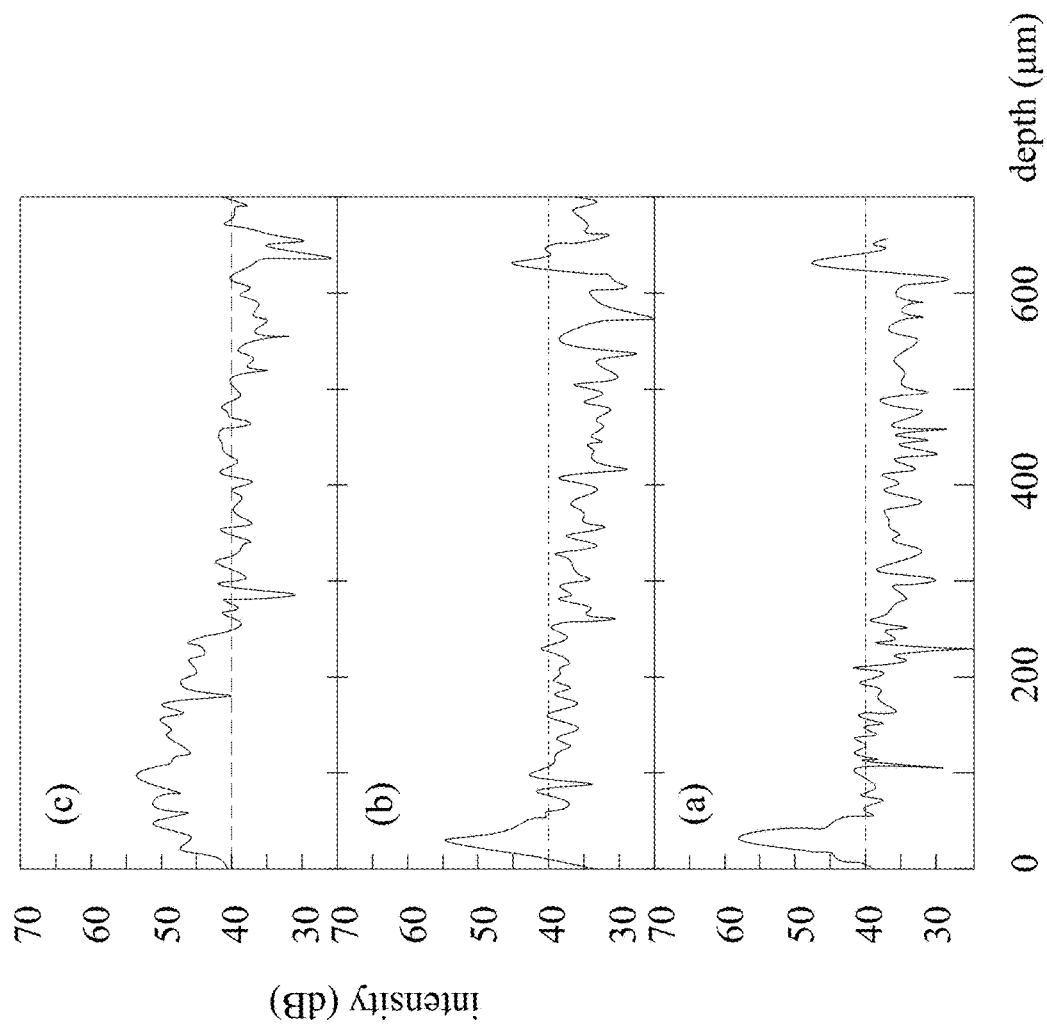
FIG. 7 shows intensity distribution results under different wave irradiation modes according to one embodiment of the present disclosure.

FIG. 7 shows intensity distribution results under different wave irradiation modes according to one embodiment of the present disclosure. In order to quantitatively compare the difference in intensity improvement, the present disclosure compares the scanning signals under three different conditions, namely, no ultrasonic irradiation (a), irradiation of 9.9 W of the ultrasonic pulse wave form (b), and irradiation of 9.9 W of the continuous wave form (c), the result is shown in FIG. 7. The intensity of figure (c) is enhanced to 14 dB as compared with figure (a), and it can also enhance the optical coherent tomography scattering signal at a deeper depth, thus proving that the microbubbles with the ultrasound irradiation can significantly improve the contrast of optical coherent tomography images. In some embodiments of the present disclosure, the microbubbles are supplemented with low-power ultrasonic irradiation as an intravascular scattering enhancement source to greatly improve the contrast of vascular imaging, thereby confirming the location of disease signs, and then applying high-power focused ultrasound to help increase the local vascular permeability so as to promote the drug release efficiency to improve the treatment effectiveness.

Figure 8:
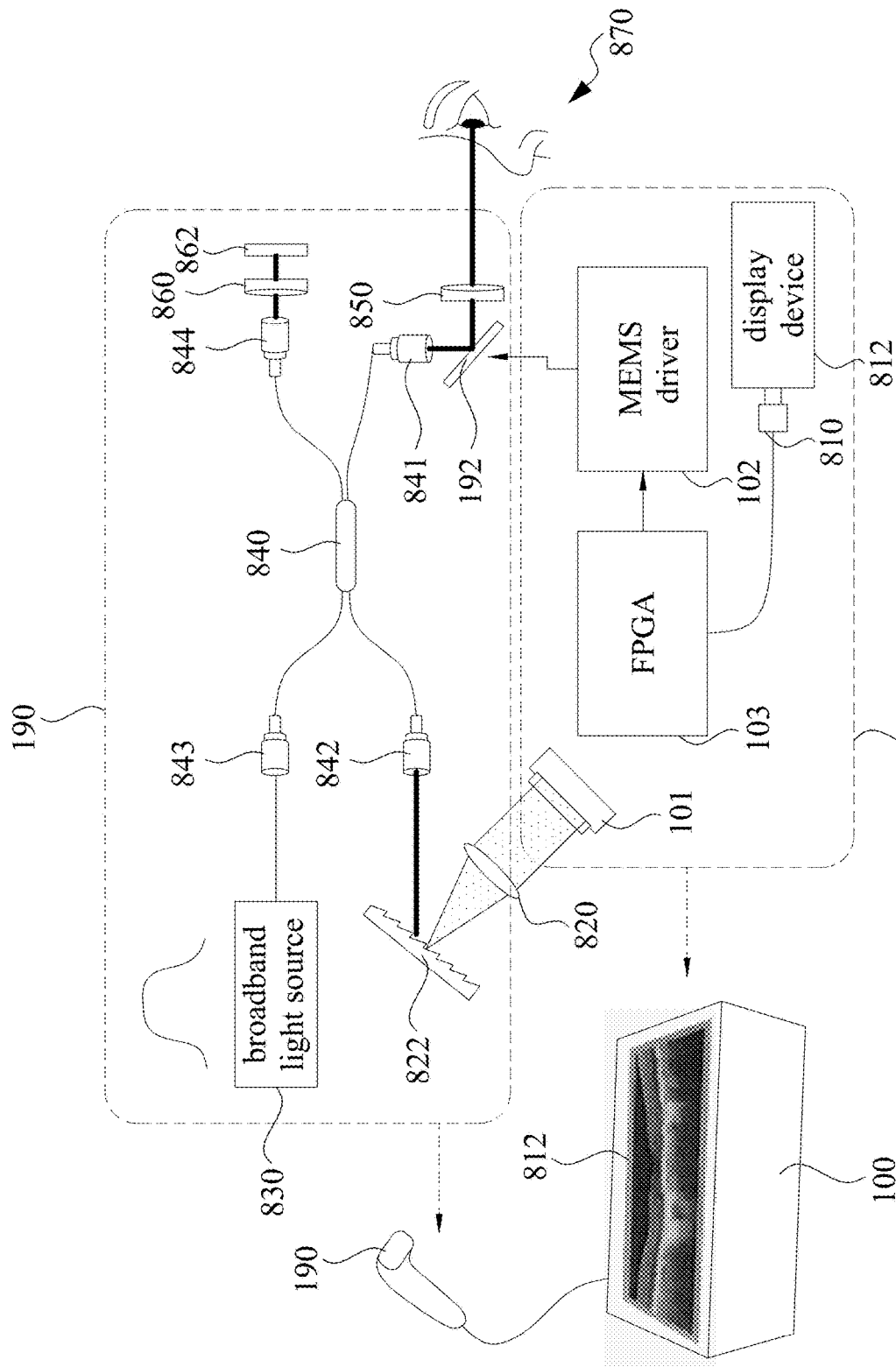
FIG. 8 is a block diagram of an image capture device according to yet another embodiment of the present disclosure.

FIG. 8 is a block diagram of an image capture device 100 according to yet another embodiment of the present disclosure. As shown in FIG. 8, the FPGA 103 is electrically connected to the USB device 810, and the USB device 810 is configured to electrically connect a display device 812. In some embodiments of the present disclosure, the USB device 810 can include the USB control chip 104 and the USB port 105 in FIG. 1.

In the optical system 190, the beam of the broadband light source 830 enters the optical collimator 843 to the optocoupler 840, and the optical path of the optical collimator 844 is aligned with the lens 860 to the reflective mirror 862. In some embodiments of the present disclosure, the broadband light source 830 can be the OCT light source 401 in FIG. 4.

As to the sample 870, in some embodiments of the present disclosure, the eye of the sample 870 can be the biological tissue 490 in FIG. 4. The optical path goes from the sample 870 through the lens 850, the MEMS scanning mirror 192 to the optical collimator 841.

On the other hand, the linear image sensor module 101 is aligned with the lens 820 (e.g., an achromatic lens) of the optical system 190; the lens 820 is located between the grating 822 of the optical system 190 and the linear image sensor module 101. In some embodiments of the present disclosure, the lens and the grating 191 in FIG. 1 can include a lens 820 (e.g., a focus lens) and a grating 822. The light beam output by optical collimator 842 is modulated by the grating 822 and reflected to the lens 820, and the light beam is sensed by linear image sensor module 101.

Figure 9:
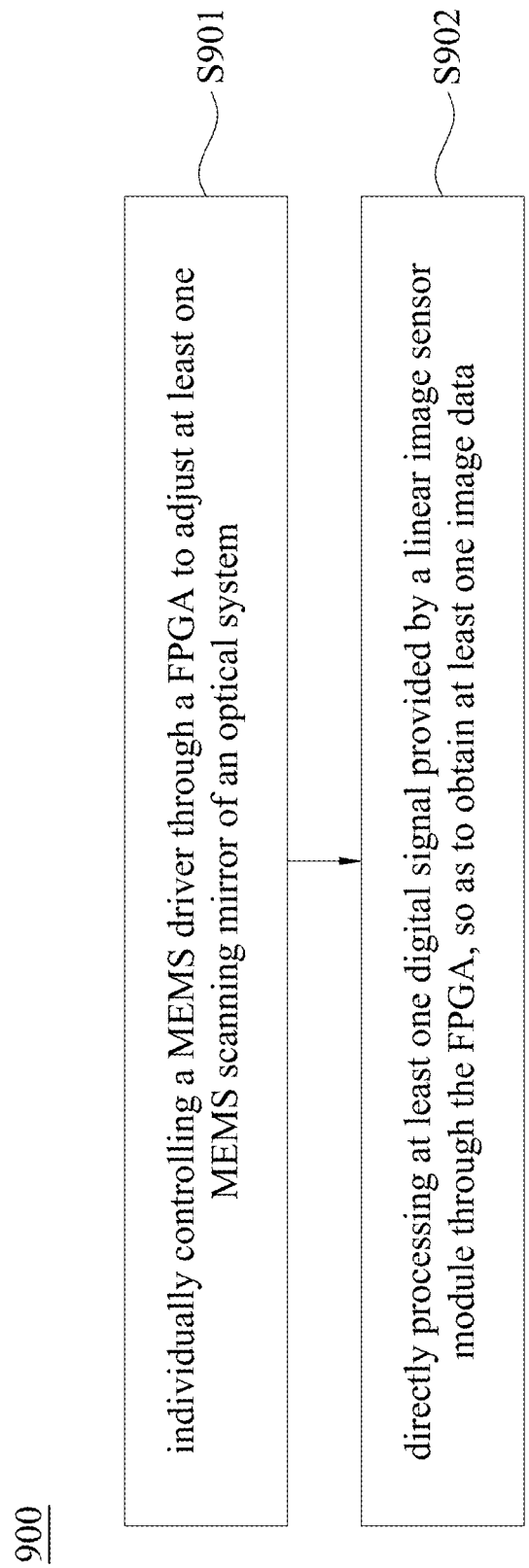
FIG. 9 is a flow chart of an operation method of an image capture device according to one embodiment of the present disclosure.

For a more complete understanding of an operation method of the image capture device 100, referring FIGS. 1-9, FIG. 9 is a flow chart of the operation method 900 of the image capture device 100 according to one embodiment of the present disclosure. As shown in FIG. 9, the operation method 900 includes steps S901 and S902. However, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently.

The operation method 900 may take the form of a computer program product on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

In step S901, the FPGA 103 individually controls the MEMS driver 102 to adjust at least one MEMS scanning mirror 192 of the optical system 190. In step S902, the FPGA 103 directly processes at least one digital signal provided by a linear image sensor module 101, so as to obtain at least one image data. In this way, operation method 900 does not need to be equipped with a computer, and can realize the scanning mechanism and image processing through FPGA 103, reducing the overall size.

In one embodiment of the present disclosure, the operation method 900 further includes: simultaneously processing a plurality of threads of execution of the MEMS driver 102 through the FPGA 103, thereby greatly saving the processing time for driving. For example, through the synchronous triggering function of the USB control chip 104, the operation of other devices can be triggered synchronously, such as the synchronous action function of the above-mentioned ultrasonic system (e.g., an ultrasonic actuator, an ultrasonic imaging device, etc.).

In one embodiment of the present disclosure, the operation method 900 further includes: simultaneously processing a plurality of threads of execution of the linear image sensor module 101 through the FPGA 103, thereby greatly saving image processing time.

In view of the above, technical advantages are generally achieved, by embodiments of the present disclosure. Through the image capture device 100 and its operation method 900 of the present disclosure, the portable optical scanner (e.g., the optical system) and the ultrasound system (e.g., the ultrasonic transducer, etc.) can use FPGA 103 to implement scanning mechanisms and image processing at the same time, thereby reducing the overall volume. Furthermore, the FPGA 103 can process multiple threads of execution at the same time, thereby greatly saving computing time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image capture device, comprising:
a linear image sensor module aligned with a lens of an optical system, and the lens located between a grating of the optical system and the linear image sensor module;
a MEMS (micro electro mechanical system) driver electrically connected to at least one MEMS scanning mirror of the optical system; and
a FPGA (field programmable gate array) electrically connected to the linear image sensor module and the MEMS driver, wherein the FPGA independently controls the MEMS driver to adjust the at least one MEMS scanning mirror, and the FPGA directly processes at least one digital signal provided by the linear image sensor module, so as to obtain at least one image data, wherein the FPGA uses its block RAM (block random access memory) to synthesize a read-only memory, the read-only memory accesses a triangular wave digital value and a register value corresponding to a functional configuration of each of a plurality of digital-to-analog converters, the FPGA transmits the triangular wave digital value and the register value to a SRAM (static random-access memory) of each of the plurality of the digital-to-analog converters through a serial peripheral interface, after the functional configuration of each of the plurality of the digital-to-analog converters is completed, the FPGA simultaneously gives a plurality of trigger signals to the plurality of the digital-to-analog converters, each of the plurality of the digital-to-analog converters correspondingly converts the triangular wave digital value in the SRAM into an analog triangle wave signal and outputs the analog triangle wave signal to a corresponding one of a plurality of amplifiers, and an amplified analog triangle wave signal output by each of the plurality of the amplifiers matches a driving voltage range of each corresponding one of the plurality of the MEMS scanning mirrors.

2. The image capture device of claim 1, wherein the FPGA simultaneously processes a plurality of threads of execution of the linear image sensor module and simultaneously processes a plurality of threads of execution of the MEMS driver.

3. The image capture device of claim 1, wherein the linear image sensor module comprises:
a plurality of analog-to-digital converters electrically connected to the FPGA;
a plurality of CCD (charge-coupled device) sensors electrically connected to the plurality of the analog-to-digital converters; and
a plurality of driving circuits electrically connected to the plurality of the CCD sensors respectively, and the plurality of the driving circuits electrically connected to the FPGA, wherein the FPGA drives the plurality of the CCD sensors through the driving circuits simultaneously, so that the plurality of the CCD sensors output a plurality of pixel analog signals to the plurality of the analog-to-digital converters respectively, the plurality of the analog-to-digital converters convert the plurality of the pixel analog signals into a plurality of digital signals respectively, and the FPGA processes the plurality of the digital signals simultaneously, so as to obtain the at least one image data.

4. The image capture device of claim 1, wherein the at least one MEMS scanning mirror comprises a plurality of MEMS scanning mirrors, and the MEMS driver comprises:
the plurality of the amplifiers electrically connected to the plurality of the MEMS scanning mirrors; and
the plurality of the digital-to-analog converters electrically connected to the plurality of the amplifiers, and the plurality of the digital-to-analog converters electrically connected to the FPGA, wherein the FPGA simultaneously sends the plurality of the trigger signals to the plurality of the digital-to-analog converters, so that the plurality of the digital-to-analog converters send the analog triangle wave signals to the plurality of the amplifiers respectively, and the plurality of the amplifiers send the amplified analog triangle wave signals to the plurality of the MEMS scanning mirrors respectively.

5. The image capture device of claim 1, further comprising:
a USB (universal serial bus) control chip electrically connected to the FPGA; and
a USB port electrically connected to the USB control chip, wherein the USB port is configured to connect a display device, and the FPGA causes the display device to render an imaging screen based on the at least one image data through the USB control chip.

6. The image capture device of claim 1, wherein an objective lens of the optical system is disposed between an interferometer and an ultrasonic transducer, and when the objective lens is aligned with a biological tissue, the ultrasonic transducer is located between the objective lens and the biological tissue.

7. The image capture device of claim 6, wherein the optical system comprises the objective lens and the interferometer, an ultrasound system comprises the ultrasonic transducer, and the FPGA simultaneously supports a synchronous operation of the optical system and the ultrasound system.

8. An operation method of an image capture device, and the operation method comprising steps of:
(A) individually controlling a MEMS (micro electro mechanical system) driver through a FPGA (field programmable gate array) to adjust at least one MEMS scanning mirror of an optical system; and
(B) directly processing at least one digital signal provided by a linear image sensor module through the FPGA, so as to obtain at least one image data,
wherein the step (A) further comprises: using a block RAM (block random access memory) of the FPGA to synthesize a read-only memory, wherein the read-only memory accesses a triangular wave digital value and a register value corresponding to a functional configuration of each of a plurality of digital-to-analog converters; using the FPGA to transmit the triangular wave digital value and the register value to a SRAM (static random-access memory) of each of the plurality of the digital-to-analog converters through a serial peripheral interface; after the functional configuration of each of the plurality of the digital-to-analog converters is completed, using the FPGA simultaneously to give a plurality of trigger signals to the plurality of the digital-to-analog converters, so that each of the plurality of the digital-to-analog converters correspondingly converts the triangular wave digital value in the SRAM into an analog triangle wave signal and outputs the analog triangle wave signal to a corresponding one of a plurality of amplifiers, wherein an amplified analog triangle wave signal output by each of the plurality of the amplifiers matches a driving voltage range of each corresponding one of the plurality of the MEMS scanning mirrors.

9. The operation method of claim 8, further comprising:
simultaneously processing a plurality of threads of execution of the MEMS driver through the FPGA.

10. The operation method of claim 8, further comprising:
simultaneously processing a plurality of threads of execution of the linear image sensor module through the FPGA.

11. The operation method of claim 8, wherein the linear image sensor module comprises a plurality of analog-to-digital converters, a plurality of CCD (charge-coupled device) sensors and a plurality of driving circuits, and the step (B) comprises:
using the FPGA to drive the plurality of the CCD sensors through the driving circuits simultaneously, so that the plurality of the CCD sensors output a plurality of pixel analog signals to the plurality of the analog-to-digital converters respectively;
using the plurality of the analog-to-digital converters to convert the plurality of the pixel analog signals into a plurality of digital signals respectively; and
using the FPGA to process the plurality of the digital signals simultaneously, so as to obtain the at least one image data.

12. The operation method of claim 8, wherein the at least one MEMS scanning mirror comprises a plurality of MEMS scanning mirrors, the MEMS driver comprises the plurality of the amplifiers and the plurality of the digital-to-analog converters, and the step (A) comprises:
using the FPGA simultaneously to send the plurality of the trigger signals to the plurality of the digital-to-analog converters, so that the plurality of the digital-to-analog converters send the analog triangle wave signals to the plurality of the amplifiers respectively; and
using the plurality of the amplifiers to send the amplified analog triangle wave signals to the plurality of the MEMS scanning mirrors respectively.

13. The operation method of claim 8, further comprising:
using the FPGA causes a display device to render an imaging screen based on the at least one image data through a USB (universal serial bus) control chip.

* * * * *